US012724961B2

(12) United States Patent
Ghasemzadeh et al.

(10) Patent No.: US 12,724,961 B2
(45) Date of Patent: Sep. 1, 2026

(54) PLAGIARISM DETECTION VIA REVISION ANALYSIS

(71) Applicant: Rumi Technologies, Inc., Redwood City, CA (US)

(72) Inventors: Mohammad Hossein Ghasemzadeh, Redwood City, CA (US); MohammadJavad NoroozOliaee, San Jose, CA (US); Ghazaleh Sadooghi, Redwood City, CA (US)

(73) Assignee: Rumi Technologies, Inc., Redwood City, CA (US)

( * ) Notice: Subject to any disclaimer, the term of this patent is extended or adjusted under 35 U.S.C. 154(b) by 162 days.

(21) Appl. No.: 18/412,848

(22) Filed: Jan. 15, 2024

(65) Prior Publication Data

US 2024/0386199 A1 Nov. 21, 2024

Related U.S. Application Data

(60) Provisional application No. 63/576,449, filed on May 10, 2023.

(51) Int. Cl.
*G06F 40/194* (2020.01)

(52) U.S. Cl.
CPC .................................. *G06F 40/194* (2020.01)

(58) Field of Classification Search
CPC ..................................................... G06F 40/194
See application file for complete search history.

(56) References Cited

U.S. PATENT DOCUMENTS

2008/0021922 A1* 1/2008 Hailpern ............. G06F 21/6227
2014/0040256 A1* 2/2014 White-Sullivan ..... G06F 16/437 707/734
2015/0186787 A1* 7/2015 Kumar ................. G06Q 10/107 707/758
2016/0034427 A1* 2/2016 Pathak ................ G06F 3/04842 715/748
2016/0132897 A1* 5/2016 Eda ....................... G06F 40/279 705/318
2019/0163695 A1* 5/2019 Castleberry ........... G06F 16/953
2019/0294687 A1* 9/2019 Rice ..................... G06F 16/1873
2023/0259699 A1* 8/2023 Cohen ................... G06F 40/194 704/9
2023/0359659 A1* 11/2023 Granit ................... G06F 16/355

OTHER PUBLICATIONS

Schneider et al. ("Detecting plagiarism based on the creation process." IEEE Transactions on Learning Technologies 11.3 (2017): 348-361. https://ieeexplore.ieee.org/abstract/document/7959638.) (Year: 2017).*

* cited by examiner

*Primary Examiner* — Pierre Louis Desir
*Assistant Examiner* — Keisha Y. Castillo-Torres
(74) *Attorney, Agent, or Firm* — Davis Hartman Wright LLP; William G. Pagán

(57) ABSTRACT

To detect plagiarism, a computing system obtains, for media content, a revision history comprising one or more revision events. Each revision event describes a modification of the media content performed via user interaction with a content editor. The computing system detects plagiarism within the media content based on the revision events.

18 Claims, 4 Drawing Sheets

PLAGIARISM DETECTION VIA REVISION ANALYSIS

RELATED APPLICATIONS

This application claims the benefit of U.S. Provisional Application No. 63/576,449 filed May 10, 2023, the entire disclosure of which is incorporated by reference herein in its entirety.

TECHNICAL FIELD

The present disclosure generally relates to the technical field of media content analysis and, more particularly, relates to the application of computational analytics techniques for detecting whether media content has been plagiarized.

BACKGROUND

Plagiarism is the practice of passing off the work of another as one's own. As the amount of content on the Internet continues to increase, it is becoming increasingly difficult to determine whether media content is original to a purported author or has been plagiarized from elsewhere. This problem is exacerbated by the recent increased use of generative Artificial Intelligence (AI) in producing content.

Generative AI is a technology that enables essentially anyone to quickly create and publish digital content without them having to author said content themselves. As generative AI technology improves, it will be increasingly difficult to distinguish human-authored content from AI-generated content. That said, just because an AI can convincingly write like a human does not mean that what they write will be rigorously vetted for factual correctness. Given society's widespread reliance on online resources as a primary source of information, the increase in AI-generated content paired with the inability to accurately identify authorship is expected to lead to an increase in the spread of online misinformation and fraud.

Particularly for text-based content, plagiarism is a growing concern in academic, professional, and online settings. Traditional plagiarism detection methods often rely on textual analysis in which a document's text is compared to a database of known sources. These methods, however, are limited in their ability to detect text that has been copied from newer chatbots (e.g., ChatGPT) that generate content instantaneously in response to a question or prompt. Plagiarism of content provided by these chatbots is often able to avoid detection because not only do they produce accurate results, but they also output information that is not already literally present in any existing database.

BRIEF SUMMARY

Embodiments of the present disclosure generally relate to analyzing the revision history of media content to determine whether or not the media content has been plagiarized, whether in whole or in part. Different embodiments may apply different general approaches to making the determination that plagiarism is either present or absent from the media content. To make such a determination, particular embodiments may, for example, include an analysis of particular revision metrics such as typing rate, revision count, manner in which the content has been modified, among other things. Additionally or alternatively, embodiments may employ a machine learning (ML) model that learns from differences between digital artifact revisions and associated metadata. In some such embodiments, the nature of the revision (e.g., deletion, pasting, dragging, dropping, typing), the timestamp of the revision, the resemblance of the revision to the final version, and/or any combination thereof may be considered in making the determination.

Particular embodiments include a method of detecting plagiarism implemented by a computing system. The method comprises obtaining, for media content, a revision history comprising one or more revision events. Each revision event describes a modification of the media content performed via user interaction with a content editor. The method further comprises detecting plagiarism within the media content based on the revision events.

In some embodiments, detecting the plagiarism within the media content based on the revision events comprises determining that less than a threshold revision time was spent performing the modifications described by the revision events.

In some embodiments, detecting the plagiarism within the media content based on the revision events comprises determining that one or more of the modifications described by the revision events were performed faster than a threshold.

In some embodiments, detecting the plagiarism within the media content based on the revision events comprises determining that the revision events are fewer in number than a threshold number of revisions.

In some embodiments, detecting the plagiarism within the media content based on the revision events comprises determining, for a given modification type, that fewer than a threshold number of the revision events describe modifications having the given modification type. In some such embodiments, the method further comprises classifying the revision events according to modification type. Detecting the plagiarism within the media content based on the revision events further comprises weighing the revision events of the given modification type differently from revision events of a different modification type.

In some embodiments, detecting the plagiarism within the media content based on the revision events comprises determining that the modification described by more than a threshold number of the revision events was performed by pasting content from outside the media content.

In some embodiments, detecting the plagiarism within the media content based on the revision events comprises calculating an originality score based on the revision events and determining that the originality score reflects less than a threshold amount of originality. The originality score reflects increasing amounts of originality with greater numbers of revision events and/or greater amounts of time spent performing the modifications described by the revision events.

In some embodiments, the method further comprises generating each revision event upon detecting the modification as the modification is performed via the user interaction with the content editor.

In some embodiments, detecting the plagiarism within the media content based on the revision events comprises using a media originality machine learning model to determine that a likelihood that the media content has been plagiarized exceeds a threshold. In some such embodiments, the method further comprises training the media originality machine learning model on a plurality of content training samples and corresponding training revision events. Each training revision event is labeled as describing either an original modification or a plagiarized modification. In some such embodiments the method additionally or alternatively comprises training the media originality machine learning model on a plurality of content training samples and corresponding training revision events. Each content training sample is labeled as either original content or plagiarized content.

Other embodiments include a computing system comprising processing circuitry and memory circuitry. The processing circuitry is configured to execute instructions stored in the memory circuitry such that the computing system is configured to obtain, for media content, a revision history comprising one or more revision events. Each revision event describes a modification of the media content performed via user interaction with a content editor. The computing system is further configured to detect plagiarism within the media content based on the revision events.

In some embodiments, to detect the plagiarism within the media content based on the revision events, the computing system is configured to determine that less than a threshold revision time was spent performing the modifications described by the revision events.

In some embodiments, to detect the plagiarism within the media content based on the revision events, the computing system is configured to determine that one or more of the modifications described by the revision events were performed faster than a threshold.

In some embodiments, to detect the plagiarism within the media content based on the revision events, the computing system is configured to determine that the revision events are fewer in number than a threshold number of revisions.

In some embodiments, to detect the plagiarism within the media content based on the revision events, the computing system is configured to determine, for a given modification type, that fewer than a threshold number of the revision events describe modifications having the given modification type. In some such embodiments, the computing system is further configured to classify the revision events according to modification type. To detect the plagiarism within the media content based on the revision events, the computing system is further configured to weigh the revision events of the given modification type differently from revision events of a different modification type.

In some embodiments, to detect the plagiarism within the media content based on the revision events, the computing system is configured to determine that the modification described by more than a threshold number of the revision events was performed by pasting content from outside the media content.

In some embodiments, to detect the plagiarism within the media content based on the revision events, the computing system is configured to calculate an originality score based on the revision events and determine that the originality score reflects less than a threshold amount of originality. The originality score reflects increasing amounts of originality with greater numbers of revision events and/or greater amounts of time spent performing the modifications described by the revision events.

In some embodiments, the computing system is further configured to generate each revision event upon detecting the modification as the modification is performed via the user interaction with the content editor.

In some embodiments, to detect the plagiarism within the media content based on the revision events, the computing system is configured to use a media originality machine learning model to determine that a likelihood that the media content has been plagiarized exceeds a threshold. In some such embodiments, the computing system is further configured to train the media originality machine learning model on a plurality of content training samples and corresponding training revision events. Each training revision event is labeled as describing either an original modification or a plagiarized modification. In some such embodiments, the computing system is additionally or alternatively configured to train the media originality machine learning model on a plurality of content training samples and corresponding training revision events. Each content training sample is labeled as either original content or plagiarized content.

Yet other embodiments include a non-transitory computer readable medium storing instructions for controlling a computing system to detect plagiarism. The software instructions, when run on processing circuitry of the computing system, cause the computing system to obtain, for media content, a revision history comprising one or more revision events. Each revision event describes a modification of the media content performed via user interaction with a content editor. The computing system is further caused to detect plagiarism within the media content based on the revision events.

In some embodiments, the computing system is further caused to perform any of the methods described above.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Embodiments of the present disclosure detect plagiarism by analyzing the creation process of digital media. This may include analyzing metrics such as typing rate, revision count, and content origin, for example. Embodiments may additionally or alternatively consider the time spent composing, the number of revisions, the amount of content copied from other sources (e.g., via a paste operation) and the like. In some embodiments, an ML model may be employed to learn from the revisions and their metadata using pre-labeled media and their revisions. Any of the above approaches may, for example, use the factors discussed above to determine an originality score.

Figure 1:
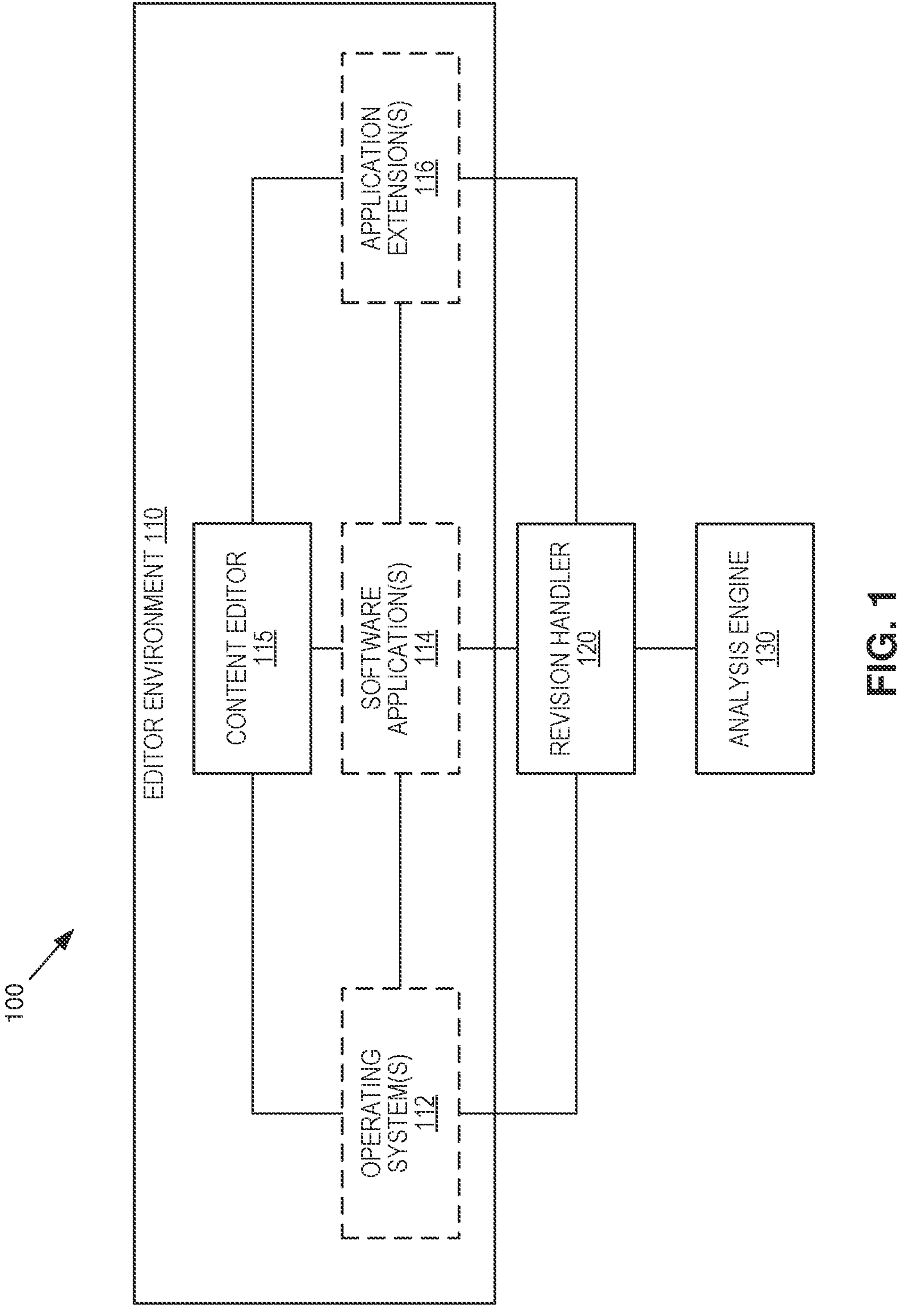
FIG. 1 is a schematic block diagram illustrating an example computing environment, according to one or more embodiments of the present disclosure.

FIG. 1 is a schematic block diagram of an example computing environment 100 according to one or more embodiments of the present disclosure. The computing environment 100 comprises an editor environment 110, a revision handler 120, and an analysis engine 130.

The editor environment 110 comprises a content editor 115 that enables media content to be modified (e.g., by a content creator or other user). The content editor may comprise, e.g., a text editor, an image editor, a video editor, or any combination thereof, through which a user is able to modify content and thereby generate new revisions of the content. When revisions are made within the editor environment 110, the editor environment 110 provides the revision handler 120 with relevant information about the revisions.

To collect and provide the relevant information to the revision handler 120, the editor environment 110 can monitor for particular revision metrics, e.g., using one or more entities. Examples of entities that can monitor for revision metrics include an operating system 112, software application 114, and/or application extension 116, any one or more of which may communicate with any other, e.g., to share information about events as they occur.

In one example, the editor environment 110 comprises a software application 116 that monitors for revision metrics. Examples of such a software application 114 may include a web application, web browser, keylogger, or other such software. The software application 114 may, for example, provide an application framework within which the content editor 115 executes for example.

The editor environment 110 may additionally or alternatively comprise an application extension 116 that monitors for revision metrics. Examples of application extensions 116 include plugins, add-ons, or any other software module that enhances the functionality of another piece of software (e.g., software application 114). According to one particular example, the application extension 116 may be an add-on installed in the user's preferred web browser or the content editor 115.

In order to monitor an application extension 116 for potential cheating, the computing system 100 may periodically scan the user's editor environment 110 and check for installed applications 114, extensions 116, and associated permissions. This may be achieved, for example, by leveraging an Application Programming Interface (API) of a software application 114 that allows the system to access and retrieve information about active extensions 116, as well as monitoring for any changes in the application's extension list. A web browser, for example, may expose this API to the computing environment 100. By cross-referencing this data with a maintained database of known cheating tools, one or elements within the computing environment 100 may identify suspicious add-ons and flag them for further investigation.

Once a potentially malicious extension is detected, the computing environment 100 may track its usage patterns and log pertinent information such as the names, versions, and timestamps of its activation. This data may be securely stored in a database, allowing administrators to review and analyze the information at a later date. By maintaining a comprehensive record of suspicious activity, the computing environment 100 may facilitate identification and prevention of cheating attempts, ensuring a fair and secure environment for users.

Revision metrics can additionally or alternatively be monitored by other entities, such as by accessing and extracting the data from the underlying processes that might be running in the computing environment 110. In one particular example, the operating system 112 of a computing system may be configured to monitor for events within the editor environment 110 and send one or more corresponding notifications to the revision handler 120. The events monitored may include, for example, interrupts, system calls, memory changes and/or instructions executed by the operating system 112 in the course of editing media content.

The revision handler 120 receives the events from the editor environment 110 and generates information regarding the revisions that is useful for a plagiarism analysis performed by the analysis engine 130. In one example, the revision handler 120 filters out events that are not significant to the plagiarism analysis, e.g., based on the type of media content being modified, the type of revision event detected, and/or the type of modification being made. For example, scrolling down within a web editor may be an insignificant event when such an event does not result in an actual change to the media content. Additionally or alternatively, the revision handler 120 may format or organize the information received from the editor environment 110 for use by the analysis engine 130. Depending on the embodiment, the revision handler 120 may exchange information with the analysis engine 130 directly (e.g., via inter-process communication) or indirectly (e.g., by storing information in a database that the analysis engine 130 subsequently retrieves).

This data provided to the analysis engine 130 may include, for example, a timestamp indicating the time an event occurred. The event data may additionally or alternatively include, for example, captured keystrokes, operations performed (e.g., paste operations), and/or mouse events, among other things.

Figure 2:
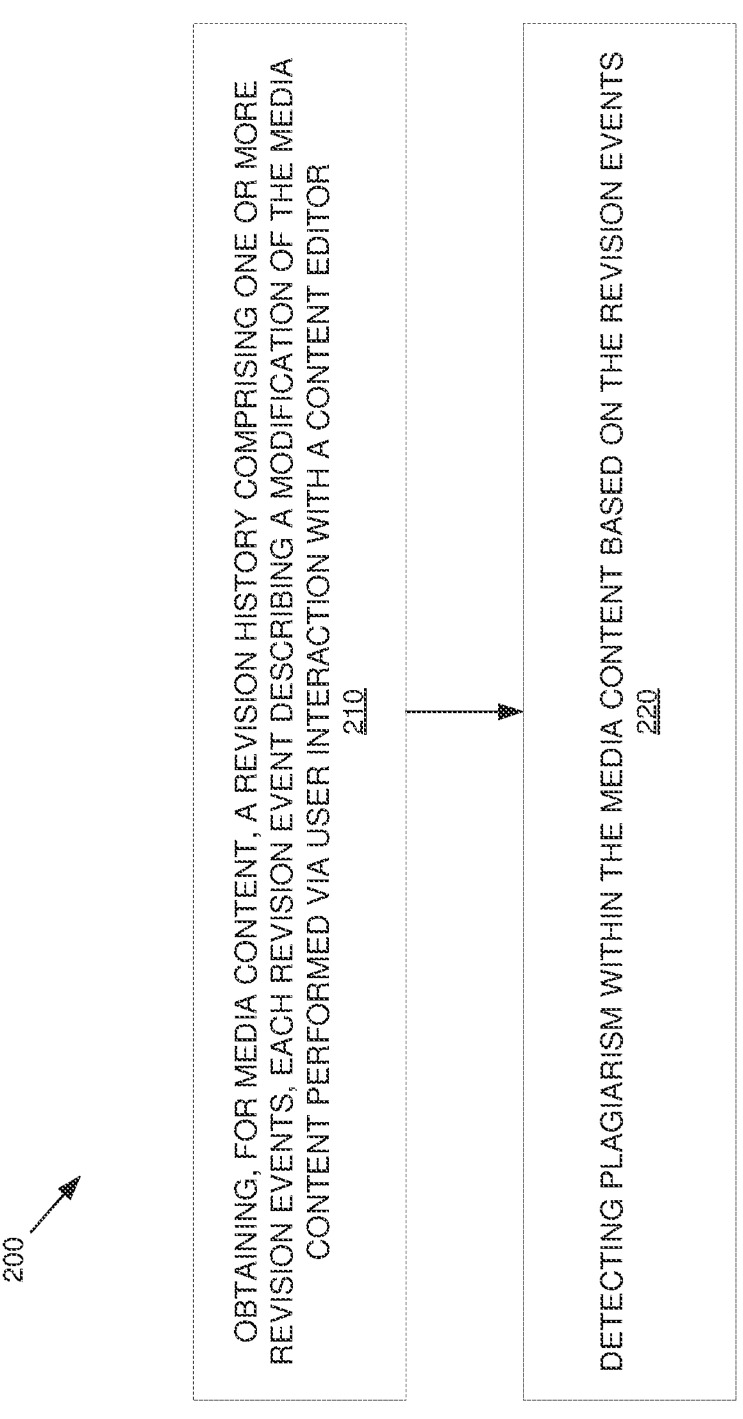
FIG. 2 is a flow diagram illustrating an example method, according to one or more embodiments of the present disclosure.

The analysis engine 130 is configured to perform analytics to detect whether any of the media content is plagiarized. For example, the analysis engine 130 may be configured to perform the method 200 illustrated in FIG. 2. The method 200 comprises obtaining, for media content, a revision history comprising one or more revision events (block 210). Each revision event describes a modification of the media content performed via user interaction with a content editor 115. The method 200 further comprises detecting plagiarism within the media content based on the revision events (block 220).

The revision history may be obtained by the analysis engine 130 as a whole (e.g., in a single message or using a single data retrieval operation) or in multiple parts (e.g., by reading records out of a database), depending on the embodiment. Other data may additionally or alternatively be obtained as well, e.g., changes in performance metrics within the computing environment 100. Examples of such performance metrics include processor, memory, and/or network utilization.

Figure 3:
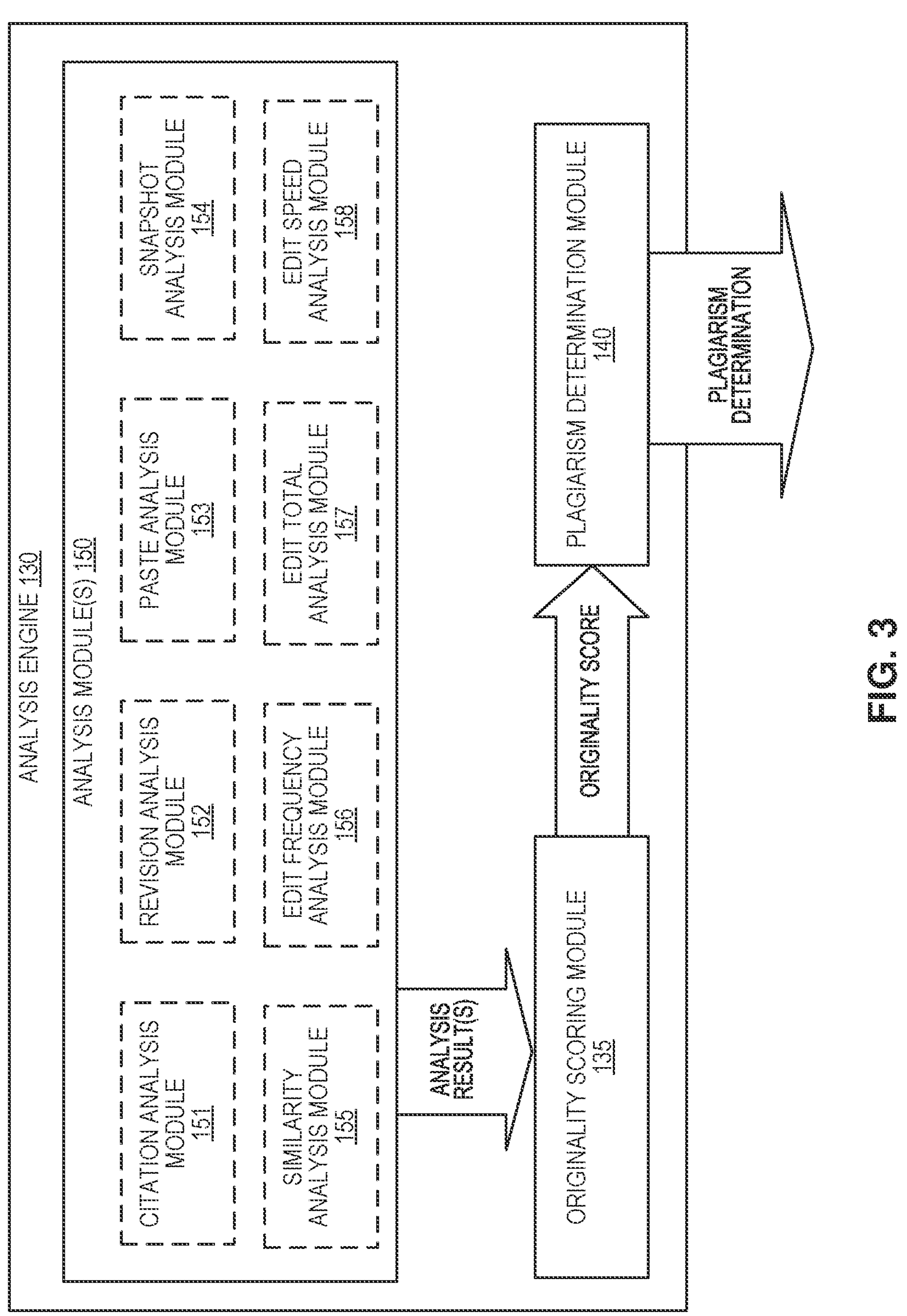
FIG. 3 and FIG. 4 are schematic block diagrams illustrating respective examples of an analysis engine according to different embodiments of the present disclosure.

To detect whether the media content, in whole or in part, has been plagiarized, the analysis engine 130 may perform one or more evaluations of the revision history. FIG. 3 illustrates an example analysis engine 130 that comprises one or more analysis modules 150, an originality scoring module 135, and a plagiarism determination module 140. The analysis module(s) 150 in this example performs evaluations of the obtained revision history according to respective criteria. The results of the analysis module(s) 150 are used by the originality scoring module 135 to generate an originality score for some or all of the media content. The plagiarism determination module 140 uses the originality score to make a determination regarding whether or not plagiarism is detected within the media content.

The analysis module(s) 150 may comprise, for example, a citation analysis module 151, a revision analysis module 152, a paste analysis module 153, a snapshot analysis module 154, a similarity analysis module 155, an edit frequency analysis module 156, an edit total analysis module 157, an edit speed analysis module 158, or any combination thereof.

The citation analysis module 151 may evaluate whether content pasted into the media content from an external source is quoted, cited, or otherwise attributed to an outside source. For example, if text is pasted into the content editor 115, but is subsequently removed, the citation analysis module 151 may produce an analysis result that is weighted in favor of originality. In contrast, if the external content remains in the final version of the content without being attributed (e.g., not placed in quotes or cited), the citation analysis module 151 may produce an analysis result that is weighted in favor of plagiarism. Between these two extremes, if the external content remains in the final version of the content and attribution is provided, the citation analysis module 151 may produce an analysis result that reflects low originality (but not necessarily plagiarism).

In view of the potentially negative impact that improperly cited externally-sourced content may have on the originality score, some applications may caution users that text pasted without proper citation or reference may adversely impact the originality assessment of their content. In doing so, users may be allowed to undo the paste action to avoid these potentially negative consequences. Alternatively, the user may be provided with an option to simply confirm their understanding of these consequences and proceed at their own discretion.

The revision analysis module 152 may evaluate whether content pasted into the media content comes from an external source or from another part of the content itself. In some embodiments, only content pasted from external sources adversely affects the determination of originality.

For example, a user of the content editor 115 may wish to move an original text paragraph from one section of a document to a different section of the document using a cut (or copy) and paste operation. The revision analysis module 152 may detect that pasted content is already represented in a previous revision of the content and may therefore refrain from weighing the operation against the media content's originality. In contrast, if the pasted content is not represented in any previous revision of the media content, the revision analysis module 152 may weigh the event against originality (i.e., in favor of a plagiarism determination).

Notably, the revision analysis module 152 may, in some embodiments, be flexible enough to ignore minor discrepancies (e.g., punctuation or spacing differences) in comparing pasted content to prior revisions. That is, the revision analysis module 152 may, in some embodiments, not require an identical match between pasted content and previous revisions in order for the source of the pasted material to be deemed internally sourced.

The paste analysis module 153 may identify instances of content being pasted into the media content, e.g., through JavaScript event listeners. This pasted content may be saved in a database for subsequent examination. Additionally or alternatively, the amount and nature of the content may be considered. Moreover, the total number of paste events may be considered. In general, paste events that are frequent and insert large content portions may adversely affect originality as compared to infrequent paste events that insert small amounts of content.

The snapshot analysis module 154 may make use of an ML model to detect AI-generated plagiarism by leveraging one or more techniques. For example, the snapshot analysis module 154 may analyze textual features like sentence structure, grammar, and/or vocabulary usage to identify patterns that may be indicative of AI-generated text. AI-generated content often exhibits specific patterns that distinguish it from human-written text.

Additionally or alternatively, the snapshot analysis module 154 may look for statistical patterns within the media content to evaluate originality. In this regard, the snapshot analysis module 154 may be configured to look for unique statistical patterns, such as character, word, or n-gram frequency distributions, which tend to be present in AI-generated text. An ML model can be trained to recognize these patterns and differentiate between human and AI-generated content.

Additionally or alternatively, the snapshot analysis module 154 may be configured to analyze writing styles (i.e., stylometry) by examining features such as sentence length, word choice, and punctuation usage. Since AI-generated text may have a distinct style that differs from human writing, stylometry can help identify potential instances of AI-generated plagiarism.

Additionally or alternatively, the snapshot analysis module 154 may be configured to detect AI-generated text by training a ML model on a large corpus of both human-written and AI-generated content snapshots. The ML model may then predict if a given text is likely to be AI-generated based on the patterns they've learned during training.

Additionally or alternatively, the snapshot analysis module 154 may be configured to look for inconsistencies in content or context and consider them to be an indicator of AI-generated plagiarism.

The various techniques described above with respect to the snapshot analysis module 154 can be integrated to generate an originality score for not only the final document version but also each intermediate revision. Subsequently, these scores can be consolidated into an overall originality score by the originality scoring module 135, where revisions may carry a lower weight in comparison to the final version.

The similarity analysis module 155 may compare the media content to AI-generated answers to the same prompt. For example, the media content may be a student's answer to a question asked by a teacher in response to a homework assignment. By comparing the user's answer to answers provided by generative AI systems (e.g., ChatGPT, Bard), the AI-provided answers are used as a reference dataset to evaluate the user's submitted response. The likelihood of the user's response being plagiarized from an AI source is determined based on the comparison.

To quantify the similarity between the media content and AI-generated content regarding the same subject matter, advanced comparison techniques such as cosine similarity, Jaccard similarity, or other text similarity measures may be employed. These metrics assess the degree of overlap in content and structure between the user's response and the AI-generated answers. A higher similarity score may indicate a higher likelihood of plagiarism, whereas a lower score would suggest that the user's response is more unique and less likely to be AI-generated, for example. By leveraging this method, it is possible to detect potential cases of plagiarism, ensuring that submitted answers reflect the user's original thinking and maintain the integrity of the evaluation process.

The edit frequency analysis module 156 may be configured to evaluate how frequently the obtained revisions occur. In this regard, the frequency of revisions may be considered over the course of the entire revision history or may be sampled at various timescales. In one particular embodiment, for each subsequent revision after the first one, the amount of time since the previous revision is considered. Revisions that are occurring faster than a human is likely to make changes would be weighed against the originality determination, whereas revisions that are generally reasonably paced with typical human interaction would be weighed in favor of originality.

The edit total analysis module 157 may be configured to evaluate the total number of revisions made, e.g., in view of the magnitude of the media content being evaluated. For example, it is unlikely that William Shakespeare could have produced his entire catalog of written works all in one stream of textual output. Rather, it is far more likely that numerous revision events would be required to produce media content of that magnitude.

The edit speed analysis module 158 may be configured to evaluate how quickly a user is able to interact with the content editor 115 to produce content. For example, a generative AI is able to output text at a far faster rate than a human would be able to type. Accordingly, in some embodiments, a user's typing speed may be gauged prior to their initiation of document drafting, such as during account registration when entering a username. The evaluation may, for example, explicitly request that users retype a given text, like "the quick brown fox jumps over the lazy dog." The edit speed analysis module 158 may then use an understanding of the user's typing speed as a baseline for evaluating whether they, or a generative AI, are actually providing input to the content editor 115.

In one example, during the document creation process, the cumulative typing time of a user may be gathered. Typing commences when the user begins inputting text and halts (or pauses) following a predetermined duration of inactivity. For instance, a typing timer that has been initiated will stop if the user refrains from pressing any keys for 15 seconds. The typing speed of a group is also collected for comparative purposes.

The overall typing speed may be determined by taking the total word count of the completed document, excluding any externally-sourced text (identified as discussed above), and dividing it by the total time spent typing.

The more time a user spends contemplating while typing, the higher the likelihood that the document is original. By considering factors such as an individual's typing speed, the collective typing speed of a group, and predefined thresholds, the system may calculate the time dedicated to contemplating the content. Increased time spent on thinking correlates with a higher probability of document originality. For instance, if a user types at a speed consistent with their recorded typing profile, it may suggest that they did not need to invest significant time in deciding what to write, hence lower chances of a document being completely original.

In addition to average overall typing speed, instantaneous typing speeds can be assessed over varying time intervals, ranging from 5 seconds to 1 hour. Examining instantaneous typing speeds across these intervals can reveal patterns. A consistent pattern is more likely to indicate originality, while an erratic pattern may suggest a lower likelihood of originality.

The originality scoring module 135 may assign weights to the analysis results obtained from the analysis module(s) 150 and generate an overall originality score based on the weighted results. The weights may vary across applications or document types. For example, argumentative essays, which often require writers to think critically and construct persuasive arguments, might assign a greater weight to typing speed for determining originality in comparison to informative essays or time-limited response tasks such as exams.

The originality score generated by the originality scoring module 135 is used by the plagiarism determination module 140 to make a plagiarism determination, e.g., based on one or more criteria. For example, the originality score may be compared against an originality threshold to determine whether or not there is plagiarism within the media content.

It should be noted analysis engine 130 may be implemented in a variety of ways other than as presented in the example of FIG. 3. For example, the evaluations performed by the various analysis module(s) 150 are depicted in FIG. 3 as individual and distinct modules but may be implemented differently in other embodiments. Indeed, any of the modules of the analysis engine 130 may be combined, supplemented with other features, or otherwise organized in order to produce a plagiarism determination using a different computational analytics approach.

Figure 4:
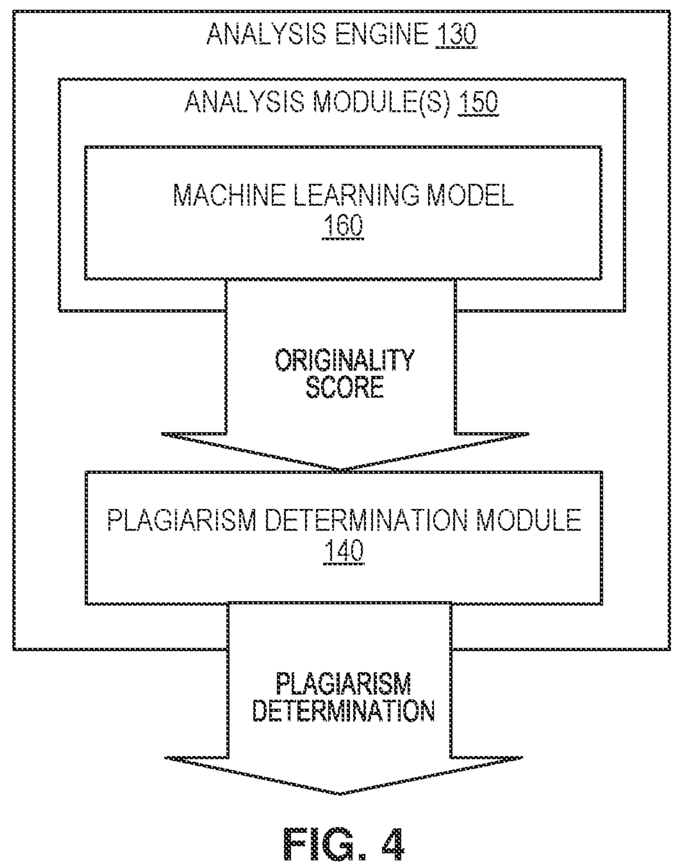

FIG. 4, for example, illustrates a different example embodiment of the analytics engine 130. In the example of FIG. 4, the analytics module(s) 150 comprises an ML model 160 that is trained to learn from the differences between each content revision, associated metadata (e.g., as described above), and how closely each revision resembles the final revision. The ML model 160 is trained using a dataset of prelabeled content samples and/or corresponding prelabeled content revisions. Each of the prelabeled samples and/or revisions may be labeled as either original or non-original (i.e., plagiarized). This dataset provides the ML model 160 with examples of various revision patterns and metadata, enabling it to discern the characteristics associated with original and non-original documents.

By analyzing the relationships among revisions, metadata, and the resemblance to the final revision, the ML model 160 can extract features that indicate the level of originality in the media content. Once the ML model 160 has been trained, it can evaluate a new content draft and its revisions to determine an originality score. This score may be calculated based on the patterns and features identified during the training process, which allows for an objective assessment of the document's originality.

It should be noted that embodiments of the present disclosure do not necessarily preclude the use of generative AI entirely. Indeed, embodiments may permit the use of generative AI systems for specific use-cases. For example, embodiments of the present disclosure may include, or permit the use of, a generative AI for fixing grammar or improving the document structure. Thus, the computing environment 100 may provide users with an option to access an "AI Chatbot" like ChatGPT, for example. However, the usage of generative AI as a tool would preferentially be monitored and recorded for later evaluation to determine the degree of originality in the document. For example, the content editor 115 may query the user to revise portions of content with something having greater originality.

In contrast, queries directing the generative AI to answer specific questions may be regarded as cheating and, therefore, blocked in some embodiments. Given that the nature of such questions involves generating new content instead of refining the user's original work, the computing environment 100 may prohibit such an interaction or weigh such actions against the originality of the media content. In sum, by tracking and assessing AI usage, the system can help maintain the integrity of the evaluation process while still allowing users to benefit from AI assistance.

Figure 5:
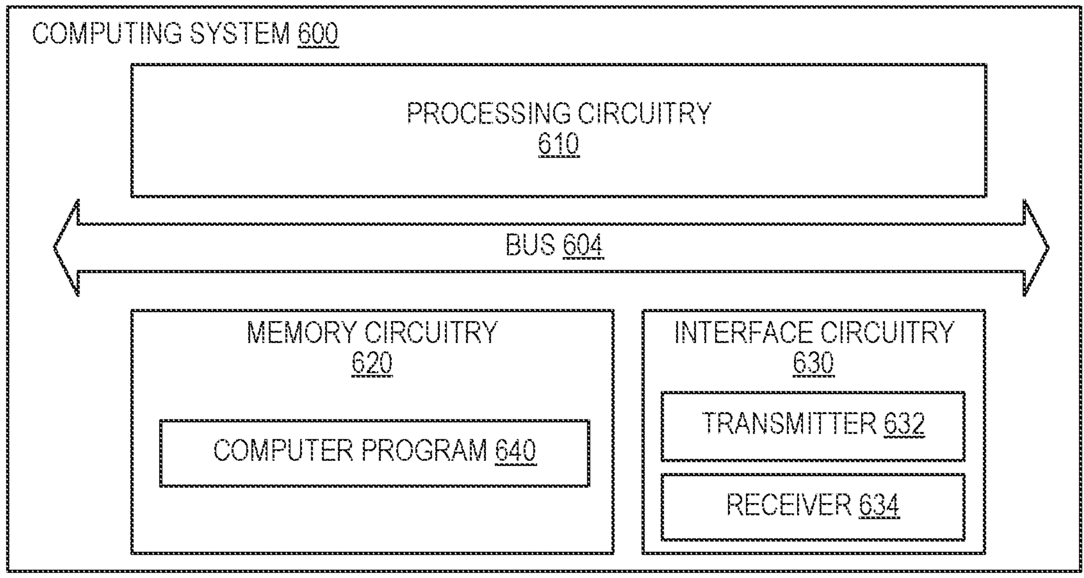
FIG. 5 is a schematic block diagram illustrating an example computing system, according to one or more embodiments of the present disclosure.

Any or all of the processing described above may, for example, be performed by a centralized or distributed computing system of one or more computing devices. Such a computing system 600 may be implemented according to the example illustrated in FIG. 5. The computing system 600 of FIG. 5 comprises processing circuitry 610, memory circuitry 620, and interface circuitry 630. The processing circuitry 610 is communicatively coupled to the memory circuitry

620 and the interface circuitry 630, e.g., via a bus 604. The processing circuitry 610 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 610 may be programmable hardware capable of executing software instructions stored, e.g., as a machine-readable computer program 640 in the memory circuitry 620.

The memory circuitry 620 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 630 may comprise a controller configured to control data paths interconnecting components of the computing system 600 and/or connecting the computing system 600 to a network. The interface circuitry 630 may be implemented as a unitary physical component, or as a plurality of physical components that are contiguously or separately arranged, any of which may be communicatively coupled to any other or may communicate with any other via the processing circuitry 610. For example, the interface circuitry 630 may comprise a transmitter 632 configured to send communication signals and a receiver 634 configured to receive communication signals, e.g., wirelessly or over a tangible medium.

According to particular embodiments, the processing circuitry 610 is configured to obtain, for media content, a revision history comprising one or more revision events. Each revision event describes a modification of the media content performed via user interaction with a content editor 115. The processing circuitry 610 is further configured to detect plagiarism within the media content based on the revision events. The processing circuitry 610 may be so configured by virtue of having executed the instructions stored in the memory circuitry 620.

Still other embodiments include a computer program 640 comprising instructions that, when executed on processing circuitry 610 of a computing system 600, cause the computing system 600 to carry out the method 200 described above.

Yet other embodiments include a carrier containing the computer program 640. The carrier may be one of an electronic signal, optical signal, radio signal, or computer readable storage medium.

Although the computing system 600 may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. While components may be depicted as single boxes within a larger box (or nested within multiple boxes), in practice the devices described herein may comprise multiple different physical components that make up a single illustrated component, and functionality may be partitioned between separate components.

In general, embodiments of the present disclosure may be implemented or performed in other ways than those specifically set forth herein without departing from essential characteristics. The present embodiments are to be considered in all respects as illustrative and not restrictive.

Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

It should also be understood that, although the ordinal terms first, second, etc. may be used herein to describe various elements, these elements are not limited by these ordinal terms. Rather, these ordinal terms are only used to distinguish one element from another. For example, a first element could be termed a second element, and, similarly, a second element could be termed a first element, without departing from the scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. Additionally, as used herein, the term "and/or" means any single item or combination of items in the associated list.

It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

What is claimed is:

1. A method of detecting plagiarism, implemented by a computing system, the method comprising:

monitoring, by a revision handler executing on one or more processors of the computing system, a content editor for user interactions that result in modifications to an individual document, the user interactions comprising keystrokes, paste operations, and mouse events;

detecting one or more of the user interactions and, in response, generating one or more revision events, each revision event describing a modification type and time spent performing a modification resulting from one or more of the detected user interactions;

sending one or more inter-process communications comprising the one or more revision events from the revision handler to a plagiarism analysis engine executing on the one or more processors of the computing system;

assigning different weights to the revision events based on the modification types;

using, by the plagiarism analysis engine, a machine learning model to calculate an originality score based on the revision events, wherein the originality score reflects:

increasing amounts of originality with greater numbers of revision events;

increasing amounts of originality with greater amounts of time spent performing the modifications described by the revision events; and different amounts of originality depending upon the different weights assigned to the revision events;

detecting, by the plagiarism analysis engine, plagiarism within the individual document based on a determination that the originality score reflects less than a threshold amount of originality; and learning, by the machine learning model, to detect further plagiarism from the one or more revision events.

2. The method of claim 1, wherein the originality score reflects less than the threshold amount of originality due to less than a threshold revision time being spent performing the modifications described by the revision events.

3. The method of claim 1, wherein the originality score reflects less than the threshold amount of originality due to one or more of the modifications described by the revision events being performed faster than a threshold.

4. The method of claim 1, wherein the originality score reflects less than the threshold amount of originality due to the revision events being fewer in number than a threshold number of revisions.

5. The method of claim 1, wherein the originality score reflects less than the threshold amount of originality due to fewer than a threshold number of the revision events describing modifications having a given modification type.

6. The method of claim 1, wherein the originality score reflects less than the threshold amount of originality due to pasted content from outside the individual document.

7. The method of claim 1, further comprising training the machine learning model on a plurality of content training samples and corresponding training revision events, each training revision event being labeled as describing either an original modification or a plagiarized modification.

8. The method of claim 1, further comprising training the machine learning model on a plurality of content training samples and corresponding training revision events, each content training sample being labeled as either original content or plagiarized content.

9. The method of claim 1, further comprising using differences between versions of the individual document before and after the detected user interactions to train the machine learning model.

10. A computing system for detecting plagiarism, the computing system comprising:

processing circuitry and memory circuitry, the memory circuitry storing instructions executable by the processing circuitry whereby the computing system is configured to:

monitor, by a revision handler, a content editor for user interactions that result in modifications to an individual document, the user interactions comprising keystrokes, paste operations, and mouse events;

detect one or more of the user interactions and, in response, generate one or more revision events, each revision event describing a modification type and time spent performing a modification resulting from one or more of the detected user interactions;

send one or more inter-process communications comprising the one or more revision events from the revision handler to a plagiarism analysis engine;

assign different weights to the revision events based on the modification types;

use, by the plagiarism analysis engine, a machine learning model to calculate an originality score based on the revision events, wherein the originality score reflects:

increasing amounts of originality with greater numbers of revision events;

increasing amounts of originality with greater amounts of time spent performing the modifications described by the revision events; and different amounts of originality depending upon the different weights assigned to the revision events;

detect, by the plagiarism analysis engine, plagiarism within the individual document based on a determination that the originality score reflects less than a threshold amount of originality; and learn, by the machine learning model, to detect further plagiarism from the one or more revision events.

11. The computing system of claim 10, wherein the originality score reflects less than the threshold amount of originality due to less than a threshold revision time being spent performing the modifications described by the revision events.

12. The computing system of claim 10, wherein the originality score reflects less than the threshold amount of originality due to one or more of the modifications described by the revision events were performed faster than a threshold.

13. The computing system of claim 10, wherein the originality score reflects less than the threshold amount of originality due to the revision events being fewer in number than a threshold number of revisions.

14. The computing system of claim 10, wherein the originality score reflects less than the threshold amount of originality due to fewer than a threshold number of the revision events describing modifications having a given modification type.

15. The computing system of claim 10, wherein the originality score reflects less than the threshold amount of originality due to pasted content from outside the individual document.

16. The computing system of claim 10, wherein the computing system is further configured to train the machine learning model on a plurality of content training samples and corresponding training revision events, each training revision event being labeled as describing either an original modification or a plagiarized modification.

17. The computing system of claim 10, wherein the computing system is further configured to train the machine learning model on a plurality of content training samples and corresponding training revision events, each content training sample being labeled as either original content or plagiarized content.

18. A non-transitory computer readable medium storing software instructions for controlling a computing system to detect plagiarism, wherein running the software instructions on processing circuitry of the computing system, causes the computing system to:

monitor, by a revision handler, a content editor for user interactions that result in modifications to an individual document, the user interactions comprising keystrokes, paste operations, and mouse events;

detect one or more of the user interactions and, in response, generate one or more revision events, each revision event describing a modification type and time spent performing a modification resulting from one or more of the detected user interactions;

send one or more inter-process communications comprising the one or more revision events from the revision handler to a plagiarism analysis engine;

assign different weights to the revision events based on the modification types;

use, by the plagiarism analysis engine, a machine learning model to calculate an originality score based on the revision events, wherein the originality score reflects:

increasing amounts of originality with greater numbers of revision events;

increasing amounts of originality with greater amounts of time spent performing the modifications described by the revision events; and different amounts of originality depending upon the different weights assigned to the revision events;

detect, by the plagiarism analysis engine, plagiarism within the individual document based on a determination that the originality score reflects less than a threshold amount of originality; and learn, by the machine learning model, to detect further plagiarism from the one or more revision events.

* * * * *